US007818343B1

(12) United States Patent
Sekhar et al.

(10) Patent No.: US 7,818,343 B1
(45) Date of Patent: Oct. 19, 2010

(54) APPARATUS AND METHODS FOR REPUTATION-BASED FILTERING ON A COMMUNICATION NETWORK

(75) Inventors: Bharath Kumar Chandra Sekhar, Santa Clara, CA (US); Narasimham Kodukula, Sunnyvale, CA (US)

(73) Assignee: Trend Micro Inc., Cupertino, CA (US)

( * ) Notice: Subject to any disclaimer, the term of this patent is extended or adjusted under 35 U.S.C. 154(b) by 239 days.

(21) Appl. No.: 11/693,582

(22) Filed: Mar. 29, 2007

(51) Int. Cl.
G06F 7/00 (2006.01)
G06F 17/30 (2006.01)

(52) U.S. Cl. .............. 707/781; 707/782; 707/783; 709/224; 709/229

(58) Field of Classification Search .............. 707/9, 707/104.1; 709/225, 229
See application file for complete search history.

(56) References Cited

U.S. PATENT DOCUMENTS

| 5,911,043 | A  | * | 6/1999 | Duffy et al. | 709/203 |
| 7,487,217 | B2 | * | 2/2009 | Buckingham et al. | 709/206 |
| 7,516,184 | B2 | * | 4/2009 | Thomas | 709/206 |
| 7,562,304 | B2 | * | 7/2009 | Dixon et al. | 715/738 |
| 2003/0182421 | A1 | * | 9/2003 | Faybishenko et al. | 709/224 |
| 2006/0010215 | A1 | * | 1/2006 | Clegg et al. | 709/206 |
| 2006/0015942 | A1 | * | 1/2006 | Judge et al. | 726/24 |
| 2006/0095586 | A1 | * | 5/2006 | Adelman et al. | 709/245 |
| 2006/0179113 | A1 | * | 8/2006 | Buckingham et al. | 709/206 |
| 2006/0212925 | A1 | * | 9/2006 | Shull et al. | 726/1 |
| 2006/0212930 | A1 | * | 9/2006 | Shull et al. | 726/10 |
| 2006/0212931 | A1 | * | 9/2006 | Shull et al. | 726/10 |
| 2007/0130351 | A1 | * | 6/2007 | Alperovitch et al. | 709/229 |

FOREIGN PATENT DOCUMENTS

WO    WO 2008073053 A1 *  6/2008

* cited by examiner

Primary Examiner—Mohammad Ali
Assistant Examiner—Angelica Ruiz
(74) Attorney, Agent, or Firm—IP Strategy Group, P.C.

(57) ABSTRACT

A method for providing reputation information concerning a domain is disclosed. The domain may include one or more devices on a network. The method may include retrieving a first reputation pertaining to a first function of the domain. The method may also include generating a message containing information pertaining to the first reputation and at least a second reputation, wherein the second reputation pertains to a second function of the domain.

20 Claims, 7 Drawing Sheets

APPARATUS AND METHODS FOR REPUTATION-BASED FILTERING ON A COMMUNICATION NETWORK

BACKGROUND OF THE INVENTION

The proliferation of malicious, inappropriate, and/or unwanted information, contents and/or messages on the Internet has necessitated individuals and organizations to adopt protection techniques and systems. Individuals and organizations may employ software and/or hardware to implement various filtering schemes for intercepting and inhibiting unauthorized attempts to access, download, or transmit malicious, inappropriate, and/or unwanted information, contents, and/or messages.

For example, in the art, there exists a filtering scheme known as uniform resource locator (URL) filtering, for detecting and managing attempts to access malicious and/or inappropriate websites. There also exists a filtering scheme known as email filtering, for detecting and managing attempts to send malicious, inappropriate, and/or unwanted email messages. In general, the various filtering schemes are implemented in disjoint arrangements with different devices and may be operated by different service providers. Example prior art arrangements for URL filtering and email filtering are discussed below with reference to FIGS. 1 and 2.

FIG. 1 illustrates an example prior art arrangement for URL filtering based on URL reputation. As illustrated in the example of FIG. 1, the arrangement may include a URL reputation server 140 connected to gateway 120, which may be operated by an enterprise.

When a user of client 101, such as an employee of the enterprise, wishes to access the website hosted at web server 152, gateway 120 may intercept the HTTP request sent by client 101. Gateway 120 may extract the URL in the HTTP request and send the URL in a URL reputation request to URL reputation server 140 through internet 130.

After receiving the URL reputation request, URL reputation server 140 may look up a database to determine the reputation of the concerned URL. URL reputation server 140 may then send a URL reputation response to gateway 120. The URL reputation response may contain URL reputation information. The URL reputation information may represent, for example, the category of the website.

Gateway 120 may determine whether to block the access to the website based on the URL reputation information. If the access is to be blocked according to the URL reputation information and to the policies (or rules) stored in gateway 120, gateway 120 may block the access and send a notification to client 101. If the access is to be allowed, gateway 120 may forward the HTTP request to web server 132 through internet 130. In return, web server 152 may provide an HTTP response to gateway 120. The HTTP response may contain the content of the website or a web page on the website. Gateway 120 may then forward the HTTP response to client 101.

FIG. 2 illustrates an example prior art arrangement for e-mail filtering based on network reputation. As illustrated in the example of FIG. 2, the arrangement may include the network reputation server 240 connected to gateway 120.

When a sending mail server 250 external to the enterprise attempts to send an e-mail message to the user of client 101, sending mail server 254 may send a TCP connection request, which may be intercepted/received by gateway 120. Gateway 120 may then extract the IP address of sending mail server 250 from the TCP connection request and send the IP address in a network reputation request to network reputation server 240 through internet 130.

After receiving the network reputation request, network reputation server 240 may look up the reputation of the IP address and then return the reputation information to gateway 120. Gateway 120 may determine whether the TCP connection should be allowed based on the network reputation information and the policies stored in gateway 120. If the connection is not to be allowed, gateway 120 may block the connection. If the connection is to be allowed, gateway 120 may establish the TCP connection between mail server 210 and sending mail server 254, such that the e-mail message may be sent to mail server 210. Mail server 210 may then hold the e-mail message until the e-mail message is retrieved or downloaded by client 101.

In general, the URL reputation requests and responses and the network reputation requests and responses may represent a significant amount of data traffic. The data traffic may significantly increase the requirements for network bandwidth, as well as processing resource of gateway 120. Given limited network bandwidth and limited processing resource of gateway 120, the data traffic ma cause, or least contribute to, congestion in the network of the enterprise. As a result, users, such as the user of client 101, may experience significant latency in accessing websites and receiving e-mail.

Further, according to the prior art arrangements, even if web server 152 and sending mail server 254 belong to the same domain, reputation requests and responses typically still have to be individually and separately sent, received, and processed. The individually and separately sent, received, and processed requests and responses for communications concerning the same domain may represent inefficient utilization of network bandwidth and processing resource.

SUMMARY OF INVENTION

An embodiment of the present invention relates to a method for providing reputation information concerning a domain. The domain may include one or more devices on a network. The method may include retrieving a first reputation pertaining to a first function of the domain. The method may also include generating a message containing information pertaining to the first reputation and at least a second reputation, wherein the second reputation pertains to a second function of the domain.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
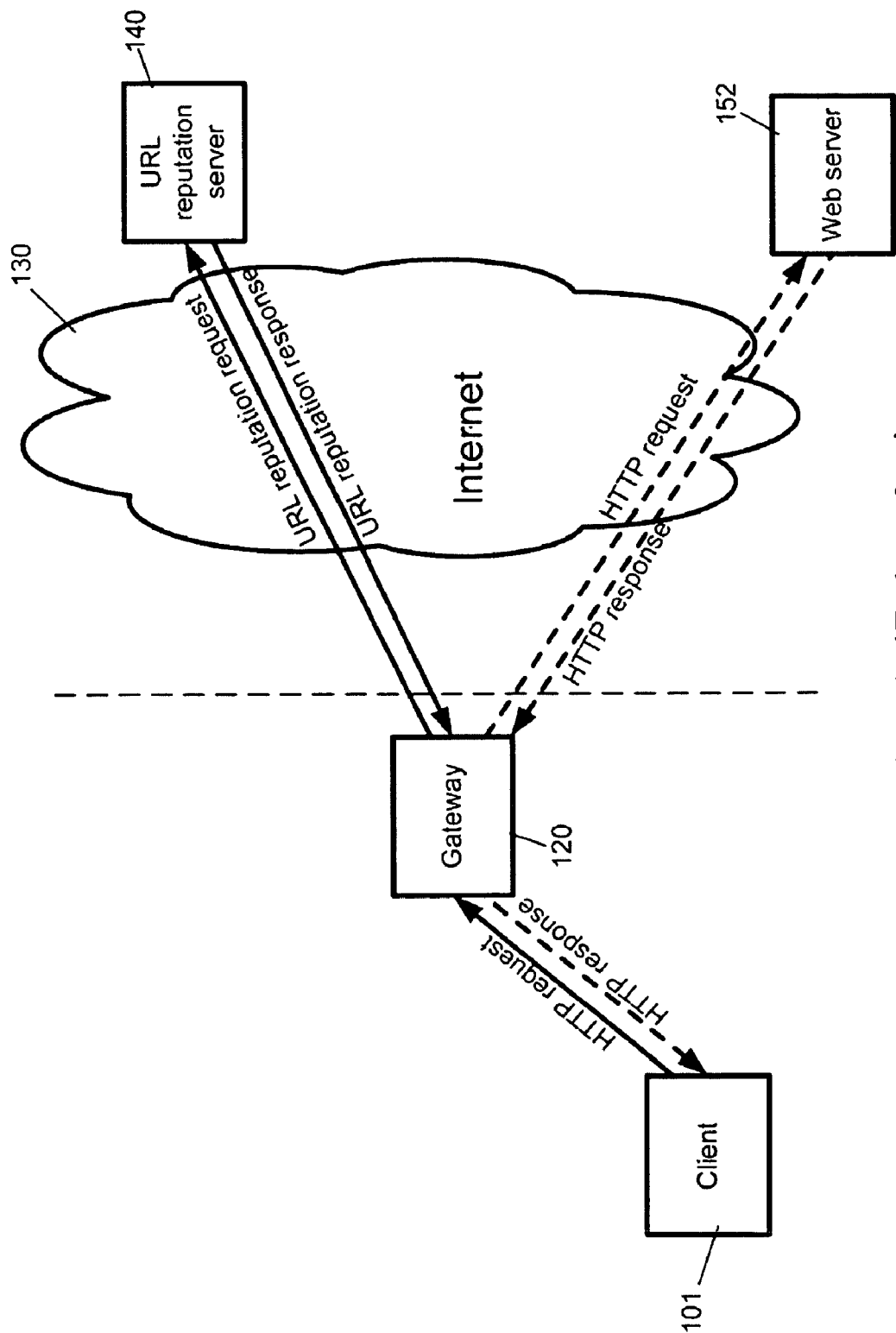
FIG. 1 illustrates an example prior art arrangement for URL filtering based on URL reputation.
Figure 2:
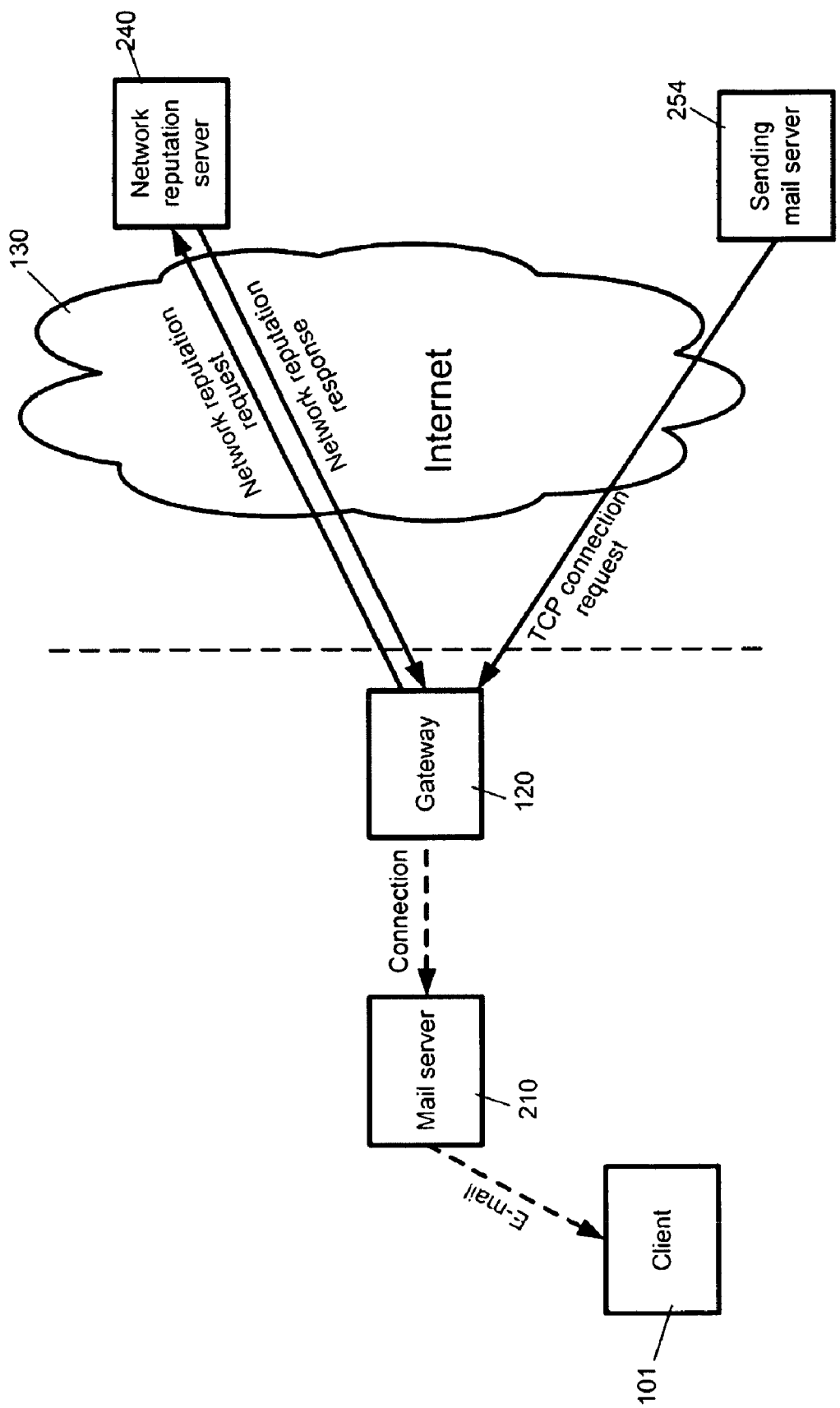
FIG. 2 illustrates an example prior art arrangement for e-mail filtering based on network reputation.

The present invention will now be described in detail with reference to a few embodiments thereof as illustrated in the accompanying drawings. In the following description, numerous specific details are set forth in order to provide a thorough understanding or the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

One or more embodiments of the present invention relate to a method for providing reputation information concerning a domain, wherein the domain may include one or more devices on a network. The method may include retrieving a first reputation pertaining to a first function of the domain. The method may also include generating a message containing information pertaining to the first reputation and at least a second reputation, wherein the second reputation ma pertain to a second function of the domain. The message may be provided in response to a request that pertains to the first reputation without being directly pertaining to the second reputation.

In one or more embodiments, the first function and the second function may be performed by two different devices. For example, the first reputation and the second reputation max represent at least two of a web reputation, a web server reputation, a mail server reputation, a fax server reputation, a messaging server reputation, and a VoIP server reputation.

In one or more embodiments, at least one of the first reputation and the second reputation includes data pertaining to one or more of a rating, a category, a name of a registered owner, a frequency of updates, a number of hits, a number of complaints, a location, and the age of the domain.

The method may also include determining the second reputation based on the first reputation. Alternatively or additionally, the method may include retrieving the second reputation based on one or more of at least one URL and at least one IP address. In one or more embodiments, the first reputation and the second reputation are retrieved from different databases.

The method may also include setting at least one of a lifespan, an expiration date, and an expiration time for at least one of the first reputation and the second reputation contained in the message.

The method may also include encoding at least one of the first reputation and the second reputation according to one or more grading schemes. For example, the one or more grading schemes may pertain to one or more of fuzzy logic, a numerical grading scheme, an alphabetical grading scheme, an alphanumerical grading scheme, a graphical grading scheme, and a color grading scheme.

One or more embodiments of the present invention relate to a method for filtering communication with a domain. The communication may pertain to at least one function of the domain, and the domain may include one or more devices on a network. The method may include receiving a message containing information pertaining to a plurality of reputations. The method may also include storing the information pertaining to the plurality of reputations. The method may further include filtering the communication using reputation information pertaining to the at least one function. The plurality of reputations may pertain to a plurality of functions of the domain. The plurality of functions of the domain may include the at least one function of the domain. The plurality of functions of the domain may include a function other than the at least one function. The information pertaining to the plurality of reputations may include the reputation information pertaining to the at least one function.

In one or more embodiments, the reputation information pertaining to the at least one function is given at least one of a lifespan, an expiration date, and an expiration time.

One or more embodiments of the present invention relate to an apparatus for providing reputation information concerning a domain, wherein the domain may include one or more devices on a network. The apparatus may include first logic configured to retrieve a first reputation pertaining to the domain based on one or more of at least one URL and at least one IP address pertaining to the domain.

The apparatus ma also include second logic configured to generate a message containing information pertaining to the first reputation and at least a second reputation. The message may be provided, in response to a request that pertains to the first reputation without being directly pertaining to the second reputation. The first reputation and the second reputation may pertain to at least two different functions of the domain.

In one or more embodiments, the first logic is further configured to retrieve the second reputation based on at least one of the at least one URL and the at least one IP address. The first reputation may be retrieved, from a first database, and the second reputation may be retrieved from a second database. Alternatively or additionally, the first and second reputations may be retrieved from the same database. In one or more embodiments, the apparatus may further include third logic configured to determine the second, reputation based on the first reputation.

The apparatus may further include a datastore configured to store the first reputation and the second reputation.

The features and advantages of the invention ma be better understood with reference to the figures and discussions that follow.

Figure 3:
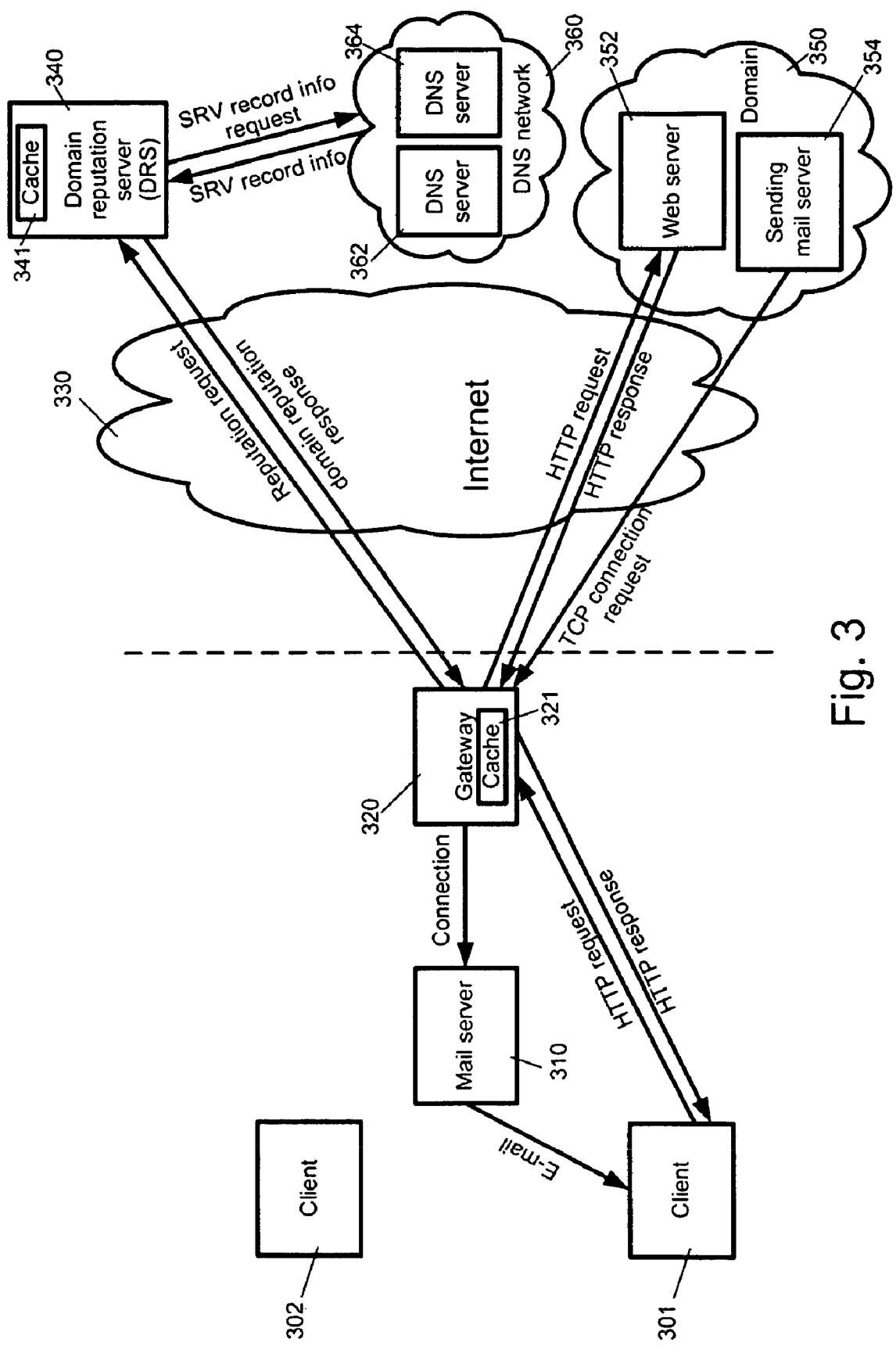
FIG. 3 illustrates an arrangement for reputation-based filtering in accordance with one or more embodiments of the present invention.

FIG. 3 illustrates an arrangement for reputation-based filtering in accordance with one or more embodiments of the present invention. As illustrated in the example of FIG. 3, the arrangement may include a domain reputation server 340 (DRS 340) connected to a DNS network 360 or DNS server farm 360). DRS 340 may also be connected to gateway 320, which may be operated by an enterprise and may include one or more of a router, a firewall, etc.

DRS 340 may include logic or a program configured to send SRV record (i.e., service record) information requests to DNS network 360 and to receive SRV record information from DNS network 360. DRS 340 may also include logic or a program configured to consolidate information (e.g., reputation information) concerning different functions of a domain into a single message. DRS 340 may also include logic or a program configured to encode the reputation information, such that the size of the message may be reduced and/or that processing of the reputation information at gateway 320 may be simplified. DRS 340 may also include cache 341 (i.e., a datastore) configured to store reputation information or SRV record information received from DNS network 360.

DNS network 360 may include one or more DNS servers, such as DNS server 362 and DNS server 364, configured to store SRV records (or service records). A SRV record may include information related to one or more of a service(s)/function(s), a protocol(s), a domain name(s), time to live, a class(es), a priority/priorities, a weight(s) a port identifications), and a host name(s) of device(s) providing the service (s)/function(s), etc. associated with certain domains. The one or more DNS servers may also store IP addresses associated with various URLs.

In one or more embodiments, when a client, such as client 301, sends out an HTTP request for accessing web server 352, and/or when a messaging server, such as sending mail server 354, sends a connection request TCP connection request) for sending a message to a user of client 301, gateway 320 may intercept the HTTP request and/or TCP connection request and may send a reputation request to DRS 340 through interne 330.

DRS 340 may look at reputation information in cache 341 and/or request SRV record information from DNS network 360. DRS reputation server may then send a domain reputation response to gateway 320. The domain reputation response may contain reputation information concerning a plurality of functions and/or devices of domain 350, wherein domain 350 may include mail server 354 and web server 352 and may include one or more other devices. For example, the domain reputation response may include reputation information about two or more of web server 352, sending mail server 354, and other entities on domain 350, such as another messaging server (e.g., an instant messaging, short message service, or multimedia message service server), a VoIP server, a fax server, etc.

The reputation information may include data pertaining to one or more of a rating, the category, the name of the registered owner, a frequency of updates, a number of hits, a number of complaints, the location, and the age associated with each of the plurality of functions of domain 350.

Gateway 320 may determine whether to allow the HTTP request (for web access) and/or the connection request (for sending the message) based on the domain reputation response as well as the policies/rules stored in gateway 320. For example, if the reputation of sending mail server 354 is associated with a category that is allowable according to the policies, gateway 320 may establish the TCP connection between sending mail server 354 and mail server 310 such that an e-mail message from sending mail server 354 may be sent to mail server 310 to be retrieved by client 301.

In one or more embodiments, gateway 320 may include a data store, or cache 321, configured to store reputation information received from domain reputation DRS 340. Whenever communication is requested, e.g., when a client sends an HTTP request or when sending mail server 354 sends a TCP connection request, gateway 320 may look up the reputation information stored in cache 321 first, before generating any reputation request. If the reputation information is available and valid in cache 321, gateway 320 may not send reputation request to DRS 340 and may locally determine whether to allow the communication. As a result, the data traffic for reputation requests and responses may advantageously reduced.

The reputation information stored in cache 321 may be given one or more lifespans and/or one or more expiration dates/times by DRS 340 and/or gateway 320 if the reputation information concerning a certain function has expired or has become invalid, gateway 320 may be required to send a reputation request after receiving a communication request pertaining to the function. Advantageously, cache 321 may maintain current and effective reputation information without storing outdated or ineffective, reputation information.

Further, the reputation information received in response to a request made by one network entity, such as client 301 or sending mail server 354, may be subsequently utilized to determine whether to allow the communication associated with a request made by another network entity, such as client 302. For example, when client 302 sends an HTTP request for accessing a website hosted in web server 352, or when sending mail server 354 sends a TCP connection request for delivering an e-mail message addressed to a user of client 302, gateway 320 may locally determine whether to allow the communication based on reputation information stored in cache 321 without sending any request to DRS 340 and without receiving any response from DRS 340.

In one or more embodiments. DRS 340 may include logic, or a program configured to determine the reputation of a function/device of domain 350 based on the reputation of another function/device of domain 350, for example, by extrapolating. For example, if reputation information of sending mail server 354 is unavailable to DRS 340, and reputation information of web server 352 is categorized by DRS 340 as "restricted", the logic or program may set the category of sending mail server 354 also as "restricted".

Figure 4:
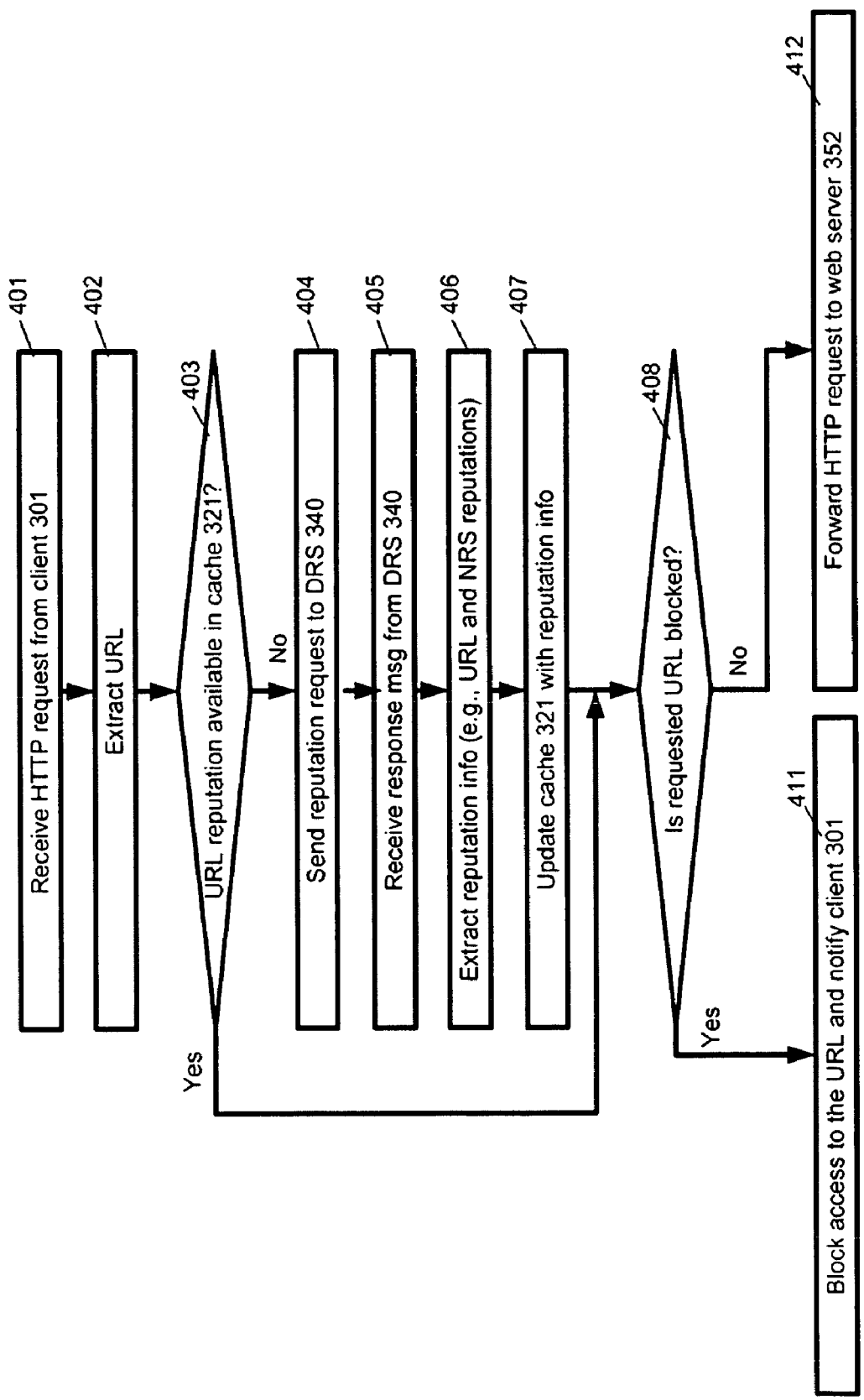
FIG. 4 shows a flowchart of an example process for URL, filtering in accordance with one or more embodiments of the present invention.

FIG. 4 shows a flowchart of an example process for URL filtering in accordance with one or more embodiments of the present invention. The process may be implemented utilizing a gateway, such as gateway 320 illustrated in the example of FIG. 3. The process is discussed below with reference to network entities illustrated in the example of FIG. 3.

As shown in the example of FIG. 4, the process may start with step 401, in which gateway 320 may receive an HTTP request from client 301.

In step 402, gateway 320 may extract the URL from the HTTP request

In step 403, gateway 320 may determine whether the URL reputation concerning the URL is available in cache 321. If the URL reputation information is available, control may be transferred to step 408. If the URL reputation information is unavailable in cache 321, control may be transferred, to step 404.

In step 404, gateway 320 may send a reputation request to DRS 340.

In step 405, gateway 320 may receive a response message from DRS 340.

In step 406, gateway 320 may extract reputation information from the response message. The reputation information may include reputation information pertaining to a plurality of functions of a domain. For example, the reputation information may include a URL reputation and a network reputation (or NRS reputation, network reputation server reputation). In one or more embodiments, the reputation information may include at least two of a web reputation, a web server reputation, a mail server reputation, a fax server reputation, a messaging server reputation, a VoIP server reputation, etc.

In step 407, gateway 320 may update cache 321 with the reputation information.

In step 408, gateway 320 may determine whether the requested URL is blocked based on the URL reputation information and the policies stored in gateway 320. If the requested URL is blocked, control is transferred to step 411, in which gateway 320 blocks the access to the URL and notifies client 301. If the requested URL is not blocked, control may be transferred to step 412, in which gateway 320 forwards the HTTP request to web server 332. As can be appreciated from the above-discussion, even gateway 320 sends a request containing only web access related reputation request, gateway 320 receives response message that contain reputation information pertaining to functions other than web access.

Figure 5:
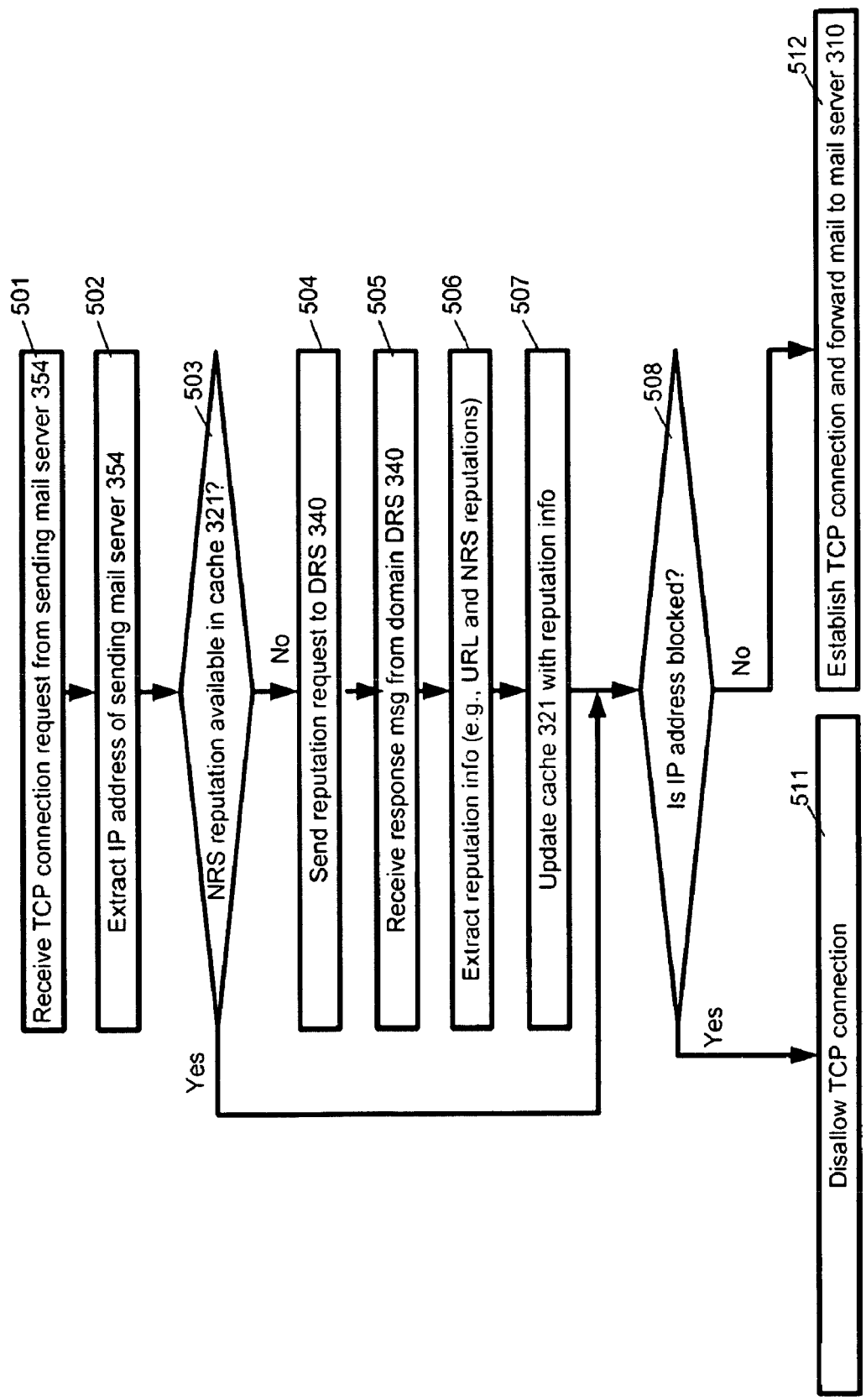
FIG. 5 shows a flowchart of an example process for e-mail filtering in accordance with one or more embodiments of the present invention.

FIG. 5 shows a flowchart of an example process for e-mail filtering in accordance with one or more embodiments of the present invention. The process may be implemented utilizing a gateway, such as gateway 320 illustrated in the example. FIG. 3. The process is discussed below with reference to network entities illustrated in the example of FIG. 3.

As shown in the example of FIG. 5, the process may start with step 501, in which gateway 320 may receive a TCP connection request from sending mail server 354 in domain 350.

In step 502, gateway 320 may extract the IF address of sending mail server 354 from the TCP connection request.

In step 503, gateway 320 may determine whether the network reputation, or NRS reputation, associated with the IP address is available in cache 321. If the NRS reputation is available in cache 321, control may be transferred to step 508. If the NRS reputation is unavailable in cache 321, control may be transferred to step 504.

In step 504, gateway 320 may send a reputation request to DRS 340.

In step 505, gateway 320 may receive a response message from DRS 340.

In step 506, gateway 320 may extract reputation information from the response message. The response message may include not only the NRS reputation associated with sending mail server 354 (or the IP address), but also reputation information concerning other functions of domain 350, such as URL reputation associated web server 352.

In step 507, gateway 320 may update cache 321 with the reputation information.

In step 508, based on the NRS reputation and the policies stored in gateway 320, gateway 320 may determine whether the IP address associated with sending mail server 354 is blocked. If the IP address is blocked, control may be transferred to step 511, in which gateway 320 may disallow the TCP connection. If the IP address is not blocked, control may be transferred to step 512, in which gateway 320 may establish TCP connection and may forward the e-mail message to mail server 3

Figure 6:
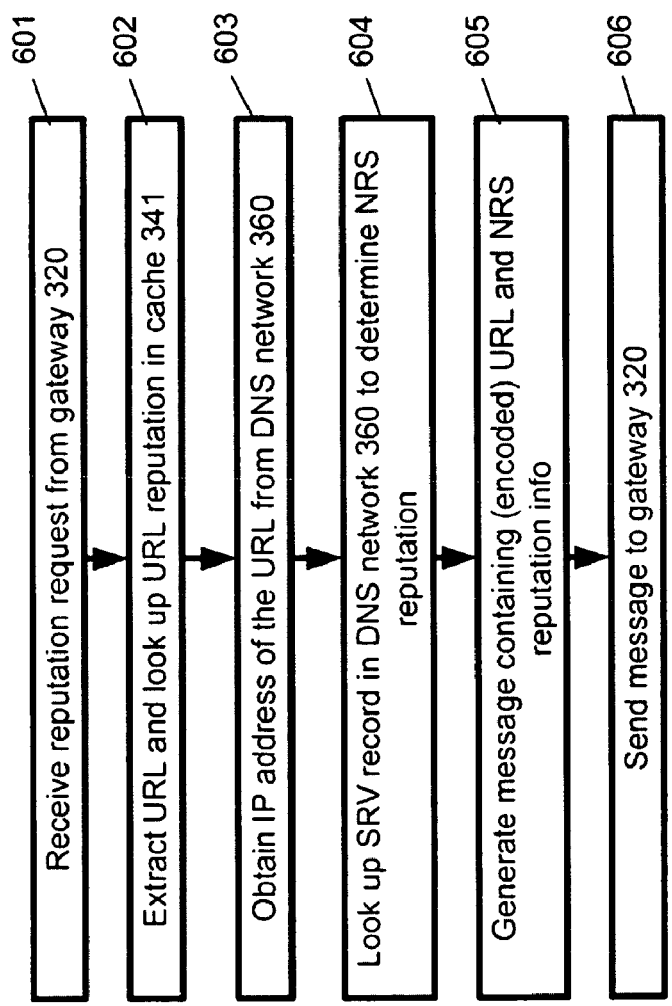
FIG. 6 shows a flowchart of an example process for providing reputation information in accordance with one or more embodiments of the present invention.

FIG. 6 shows a flowchart of an example process for providing reputation information in accordance with one or more embodiments of the present invention. The process may be implemented utilizing one or more (interconnected) reputation servers, such as DRS 340. The process is discussed below with reference to network entities illustrated in the example of FIG. 3.

As shown in the example of FIG. 6, the process may start with step 601, in which DRS 340 may receive a reputation request from gateway 320. The reputation request may pertain to only one function of domain 350 without directly pertaining to other functions of domain 350.

In step 602. DRS 340 may extract the URL contained in the reputation request and look up URL reputation (and other information) in cache 341.

In step 603. DRS 340 may obtain the IP address (or IP addresses) associated with the URL from DNS network 360.

In step 604. DRS 340 may look up SRV records (i.e., service records) in DNS network 360 to determine the NRS reputation and/or other reputation information associated with the IP address and/or URL.

In step 605. DRS 340 may generate a message containing reputation information such as URL reputation information and NRS reputation information. The reputation information may be encoded utilizing one or more encoding and/or grading schemes. The one or more encoding and/or grading schemes may pertain to one or more of fuzzy logic, a numerical grading scheme, an alphabetical grading scheme, an alphanumerical grading scheme, a graphical grading scheme, and a color grading scheme. As a result of the encoding, the size of the message may be reduced, and/or the efficiency of processing the message/reputation information at gateway 320 may be improved.

In step 606. DRS 340 may send the message to gateway 320.

Figure 7:
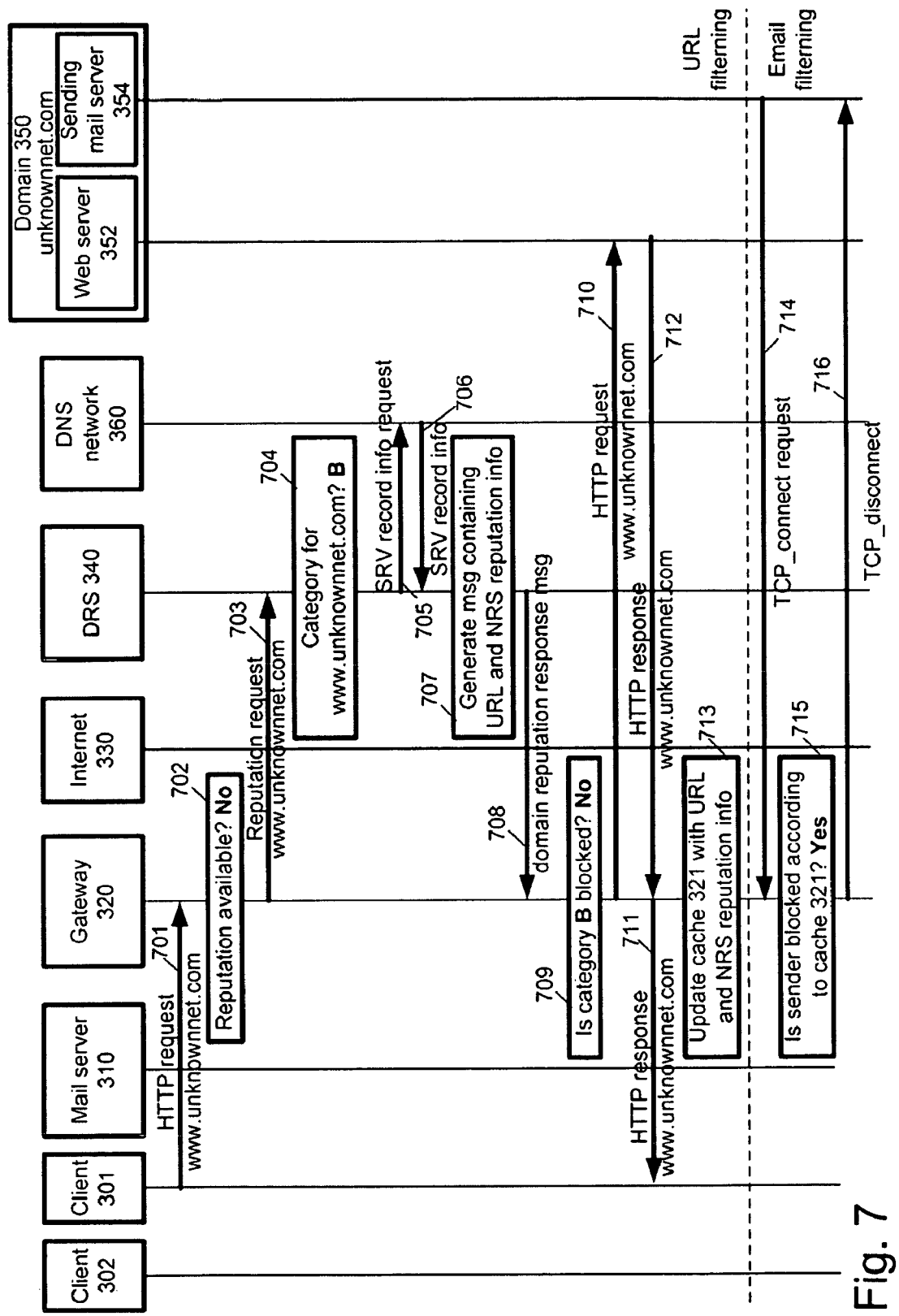
FIG. 7 shows a call flow of an example communication scenario in accordance with one or more embodiments of the present invention.

FIG. 7 shows a call flow of an example communication scenario in accordance with one or more embodiments of the present invention. The example communication scenario is discussed with reference to network entities illustrated in the example of FIG. 3. In the example communication scenario, the user of client 301 wishes to access a website hosted by web server 352 in domain 350, and, at a later time, sending mail server 354 wishes to send an e-mail message to a user of client 302. Accordingly, the communication scenario involves URL filtering and subsequent e-mail filtering.

As shown in the example of FIG. 7, the call flow may start with step 701, in which client 301 may send an HTTP request to gateway 320, the HTTP request may contain a URL, for illustration, www.unknownnet.com, associated with domain 350.

In step 702, gateway 320 may determine whether there is available reputation information for the URL (www.unknownnet.com) in cache 321 (illustrated in the example of FIG. 3). In this communication scenario, the reputation information concerning the URL is unavailable in cache 321.

In step 703, gateway 320 may send a reputation request containing the URL to DRS 340 through internet 330.

In step 704. DRS 340 may look up cache 341 (illustrated in the example of FIG. 3) to determine the reputation of the URL (www.unknownnet.com). In this communication scenario, for illustration, the category is B.

In step 705, DRS 340 may send a SRV record information request to DNS network 360.

In step 706, DNS network 360 may provide the requested SRV record information to DRS 340.

In step 707, DRS 340 may generate a domain reputation response message containing both of the URL reputation information and NRS reputation information.

In step 708, DRS 340 may send the domain reputation response message to gateway 320.

In step 709, gateway 320 ma extract the reputation information from the message, and may subsequently determine whether to block the communication (or website access) based an the URL reputation information and the policies (or rules) stored in gateway 320. As mentioned above, in this example communication scenario, the category of the URL is B. Gateway 320 may determine whether category B is blocked. In this example scenario, category B is not blocked.

In step 710, gateway 320 may forward the HTTP request to web server 352.

In response, in step 712, web server 352 may return an HTTP response.

In step 711, gateway 320 may forward the HTTP response to client 301.

In step 713, gateway 320 may update cache 321 with both of the URL, reputation information and NRS reputation information received from DRS 340.

At a later time, in step 714, sending mail server 354 may send a TCP connect request to gateway 320, attempting to deliver an e-mail message to the user of client 302.

In step 715, gateway 320 may look up the NRS reputation information associated with sending mail server 354 (or domain 350) cache 321, and may accordingly determine whether to block the attempt of sending mail server 354, taking into account the policies stored in gateway 320. Since the NRS reputation information is available and valid in cache 321, gateway 320 may be able to determine whether to allow the delivery of e-mail messages from sending mail server 354 without exchanging requests and responses with DRS 340. Advantageously, the gateway 320 may make decisions locally without significantly generating data traffic.

In this example scenario, sending mail server 334 is to be blocked.

In step 716, gateway 320 may send a TCP_disconnect message to sending mail server 354 and reject the connection request.

As can be appreciated from the foregoing, embodiments of the present invention may significantly reduce the data traffic associated with reputation requests and responses for filtering of communication (e.g., for accessing websites, downloading contents, transmitting messages, etc.). As a result, network bandwidth and gateway processing resource requirements may be significantly reduced. Advantageously, infrastructure costs may be reduced, infrastructure may be more efficiently utilized, and/or latency experienced by users may be minimized.

Embodiments of the invention also enable a gateway to obtain reputation from a single source, instead of multiple sources. Advantageously, network architecture, maintenance, and administration may be simplified.

Further, embodiments of the invention enable reputation information concerning multiple functions to be stored in a gateway. Advantageously, the impact of failure or unavailability of remote reputation servers may be minimized. At the same time, since the reputation information is given a lifespan or expiration date/time, effectiveness of filtering may be maintained.

Further, embodiments of the invention enable messages and web access attempts to be filtered at the connection level without requiring contents to be detected. Advantageously, efficiency of filtering may be significantly improved.

While this invention has been described in terms of several embodiments, there are alterations, permutations, and equivalents, which fall within the scope of this invention. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A method for providing reputation information concerning a domain, the domain including one or more devices on a network, the method comprising: storing reputation information in a cache of a server hardware device such that states of storage elements in the cache of the server hardware device are physically transformed; retrieving, from the cache of the server hardware device, a first reputation pertaining specifically to a first function of the domain, the first function of the domain being performed by a first device of the domain, the domain including at least the first device and a second device, the first device performing the first function, the second device performing a second function different from the first function, the first function being related to providing a first service, the second function being related to providing a second service different from the first service; receiving at the server hardware a reputation request sent from a gateway hardware device, the reputation request pertaining to the first reputation without directly pertaining to a second reputation, the second reputation pertaining specifically to the second function of the domain, the second function of the domain being performed by the second device of the domain; retrieving the second reputation from a second server hardware device; generating, using the server hardware device, a message in response to the reputation request, the message containing at least both information pertaining to the first reputation and information pertaining to the second reputation for controlling access to at least one of the first function of the domain and a the second function of the domain; and providing the message to the gateway hardware device.

2. The method of claim 1 wherein the first reputation and the second reputation represent at least two of a web reputation, a web server reputation, a mail server reputation, a fax server reputation, a messaging server reputation, and a VoIP server reputation.

3. The method of claim 1 further comprising encoding at least one of the first reputation and the second reputation in the message using a graphical grading scheme.

4. The method of claim 1 further comprising encoding at least one of the first reputation and the second reputation in the message using a color grading scheme.

5. The method of claim 1 wherein at least one of the first reputation and the second reputation includes data pertaining to one or more of a frequency of updates, a number of hits, a number of complaints, a location, and an age of the domain.

6. The method of claim 1 further comprising determining the second reputation based on the first reputation.

7. The method of claim 1 further comprising retrieving the second reputation based on one or more of at least one URL and at least one IP address.

8. The method of claim 1 wherein the first reputation is retrieved from a first database, and the second reputation is retrieved from a second database.

9. The method of claim 1 further comprising using at least one of the server hardware device and the gateway hardware device to include at least one of reputation lifespan information, reputation expiration date information, and reputation expiration time information for at least one of the first reputation and the second reputation contained in the message.

10. The method of claim 1 further comprising encoding at least one of the first reputation and the second reputation using one or more grading schemes.

11. The method of claim 10 wherein the one ol more grading schemes pertain to one or more of fuzzy logic, a numerical grading scheme, an alphabetical grading scheme, an alphanumerical grading scheme, a graphical grading scheme, and a color grading scheme.

12. A method for filtering communication with a domain, the communication pertaining to at least one function of the domain, the domain including one or more devices on a network, the method comprising:

receiving, using a gateway hardware device, a message containing information pertaining to a plurality of reputations;

storing the information pertaining to the plurality of reputations in a data store of the gateway hardware device such that states of storage elements in the data store of the gateway hardware device are physically transformed, the information pertaining to the plurality of reputations including at least reputation information pertaining to the at least one function, the communication involving interaction with at least a first device of the one or more devices, the at least one function being at least partially performed by the first device;

providing at least one of reputation lifespan information, a reputation expiration date information, and a reputation expiration time information for the reputation information pertaining to the at least one function stored in the data store of the gateway hardware device;

determining whether the reputation information pertaining to the at least one function stored in the data store of the gateway hardware device has expired;

sending, using the gateway hardware device, a reputation request for requesting current reputation information pertaining to the at east one function if the reputation information pertaining to the at least one function stored in the data store of the gateway hardware device is determined to be expired after the determining; and filtering, using the gateway hardware device, the communication-using the reputation information pertaining to the at least one function stored in the data store of the gateway hardware device if the reputation information pertaining to the at least one function stored in the data store of the gateway hardware device is determined to be not expired after the determining, wherein the plurality of reputations pertains to a plurality of functions of the domain, the plurality of functions of the domain includes the at least one function of the domain performed by a first device of the domain, the plurality of functions of the domain includes at least a function, performed by a second device of the domain, other than the at least one function, and the information pertaining to the plurality of reputations includes the reputation information pertaining to the at least one function.

13. The method of claim 12 wherein the reputation information pertaining to the at least one function has at least one of a lifespan, an expiration date, and an expiration time.

14. The method of claim 12 wherein the plurality of reputations includes at least two of a web reputation, a web server reputation, a mail server reputation, a fax server reputation, a messaging server reputation, and a VoIP server reputation.

15. An apparatus for providing reputation information concerning a domain, the domain including one or more devices on a network, the apparatus comprising:

a data storage of a server hardware device for storing reputation information;

first logic configured to retrieve from the data storage of the server hardware device a first reputation pertaining specifically to a first function of the domain, the first function of the domain being performed by a first device of the domain, the domain including at least the first device and a second device, the first device performing the first function, the second device performing a second function different from the first function, the first function being related to providing a first service, the second function being related to providing a second service different from the first service;

second logic for receiving at the server hardware a reputation request sent from a gateway hardware device, the reputation request pertaining to the first reputation without directly pertaining to a second reputation, the second reputation pertaining specifically to the second function of the domain, the second function of the domain being performed by the second device of the domain;

third logic configured to retrieve the second reputation from a second server hardware device;

fourth logic configured to generate a message in response to the reputation request, the message containing at least both information pertaining to the first reputation and information pertaining to the second reputation for controlling access to at least one of the first function of the domain and the second function of the domain;

fifth logic configured to provide the message to the gateway hardware device; and circuits implementing the first logic, the second logic, the third logic, the fourth logic, and the fifth logic.

16. The apparatus of claim 15 wherein the first reputation and the second reputation represent at least two of a web reputation, a web server reputation, a mail server reputation, a fax server reputation, a messaging server reputation, and a VoIP server reputation.

17. The apparatus of claim 15 further comprising sixth logic configured to encode the first reputation and the second reputation in the message using at least one of a graphical grading scheme and a color grading scheme.

18. The apparatus of claim 15 further comprising sixth logic configured to determine the second reputation based on the first reputation.

19. The apparatus of claim 15 wherein the third logic is configured to retrieve the second reputation based on at least one of the at least one URL and the at least one IP address, wherein the first reputation is retrieved from a first database, and the second reputation is retrieved from a second database.

20. The apparatus of claim 15 further comprising: a datastore configured to store the first reputation and the second reputation; and sixth logic configured to encode at least one of the first reputation and the second reputation.

* * * * *

UNITED STATES PATENT AND TRADEMARK OFFICE
CERTIFICATE OF CORRECTION

| | | |
|---|---|---|
| PATENT NO. | : 7,818,343 B1 | Page 1 of 1 |
| APPLICATION NO. | : 11/693582 | |
| DATED | : October 19, 2010 | |
| INVENTOR(S) | : Bharath Kumar Chandra Sekhar et al. | |

It is certified that error appears in the above-identified patent and that said Letters Patent is hereby corrected as shown below:

On the title page item (73),

Assignee: Trend Micro Inc. (Cupertino, CA) is incorrect. Please amend the assignee to read:

Assignee: Trend Micro Inc. (Tokyo, Japan)

Signed and Sealed this
Twentieth Day of September, 2011

David J. Kappos
*Director of the United States Patent and Trademark Office*